Feb. 22, 1938.      R. E. MILLER      2,109,168
BRAKE CONTROL MEANS
Filed April 6, 1936
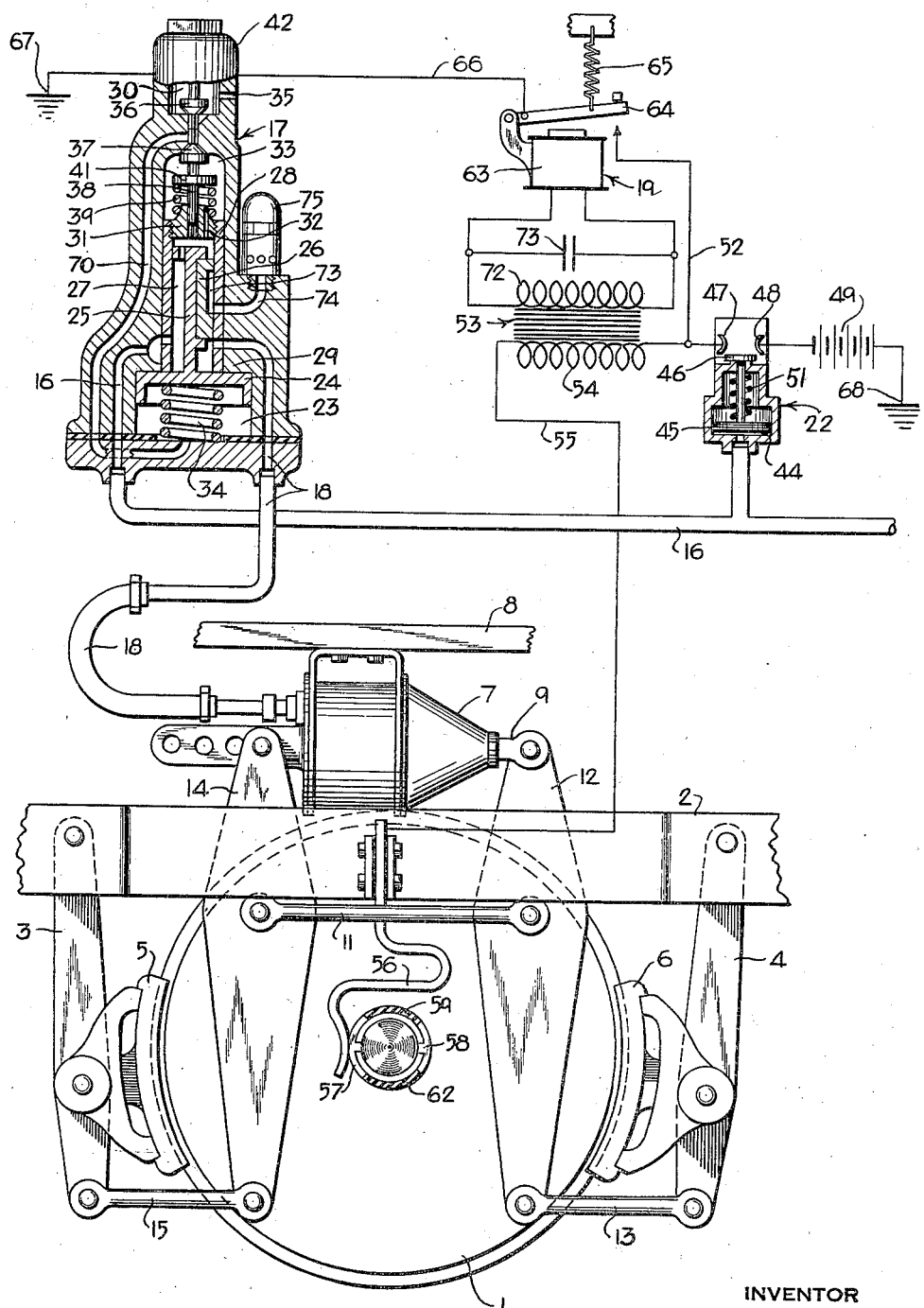
INVENTOR
RAYMOND E. MILLER
BY
*Wm. M. Cady*
ATTORNEY Patented Feb. 22, 1938

2,109,168

UNITED STATES PATENT OFFICE 2,109,168

BRAKE CONTROL MEANS

Raymond E. Miller, Wilkinsburg, Pa., assignor to The Westinghouse Air Brake Company, Wilmerding, Pa., a corporation of Pennsylvania Application April 6, 1936, Serial No. 72,889

17 Claims. (Cl. 303—21)

My invention relates to brake systems for vehicles and more particularly to means for reducing the degree of application of the brakes upon the sliding of the wheels on the rails.

It is well known that for a given braking pressure friction type brakes are less effective in retarding the motion of a vehicle at high speed than at low speed because the coefficient of friction between the rubbing parts is lower at high speed than at low speed. In order to bring the vehicle to a stop quickly it has been the usual practice for an operator to apply the brakes with a high degree of braking pressure at the high speed and as the speed of the vehicle decreases to so operate the brakes as to cause the braking pressure to decrease in such manner that the vehicle is brought to a stop quickly and smoothly without sliding of the wheels.

When railway trains and traction vehicles are operated at very high speeds a correspondingly high braking force must be employed to bring the train or vehicle to a stop in a reasonable length of time.

When a braking force is applied corresponding to a full service or emergency application of the brakes at high vehicle speeds the braking pressure may exceed the pressure required to slide the wheels as the car speed reduces. The problem of properly reducing the braking force by manual operation as the vehicle slows down becomes a difficult one and there is considerable danger of wheels sliding on the rails. It is, therefore, desirable to provide, as a part of the braking equipment on high speed trains and vehicles, some means for automatically relieving wheel sliding when it occurs.

It is an object of this invention to provide means responsive to the sliding of the wheels on the rails for reducing brake cylinder pressure to a predetermined low value, and thus prevent the continuance of the sliding of the wheels.

Other advantages and objects will appear from the following description of my invention taken in connection with the accompanying drawing in which the single figure is a diagrammatic view of one preferred embodiment of the invention.

Referring to the drawing a car wheel 1 is illustrated that is mounted to be carried by the usual truck frame 2 from which are supported hanger bars 3 and 4 for supporting brake shoes 5 and 6 on opposite sides of the car wheel. A brake cylinder 7 is provided, supported on the car frame 8, and from which a piston stem 9 extends through the low pressure end and is pivotally connected to a front cylinder lever 12, the lower end of which is connected to the lower end of the hanger bar 4 by a brake rod 13. A back cylinder lever 19 is provided, the upper end of which is pivoted to the pressure end of the brake cylinder 7 and the lower end of which is connected by a brake rod 15 to the lower end of the hanger bar 3. The two cylinder levers 14 and 12 are connected together at points intermediate their ends by the cylinder lever rod 11.

To apply the brakes fluid under pressure is supplied to the brake cylinder 7 through a control pipe 16, a brake control valve device 17 and brake cylinder pipe 18 as supplied, for example, by a relay valve device, not shown, in a known manner. A magnet valve device is provided in the upper portion of the brake control valve device 17 and is controlled by a tuned relay 19 and a pressure responsive switch 22 in a manner to be later described.

The brake control valve 17 comprises a casing providing a piston chamber 23 containing a piston 24 having a piston stem 25 for engaging a slide valve 26 contained within a slide valve chamber 27 also provided within a bushing 28 and which extends upwardly from a shoulder 29 against which the piston 24 is adapted to engage. A screw plug 31 is provided in the upper end of the bushing 28 to form a partition between the valve chamber 27 and a chamber 33 connected by a port 32 through the plug 31. A spring 34 is provided within the piston chamber 23 for normally urging the piston 24 against the shoulder 29.

An exhaust chamber 30 is also provided within the casing of the brake control valve device 17 that is in constant open communication with the atmosphere through an exhaust port 35 and which contains a valve 36 having a stem extending through a bore in a partition between the chamber 34 and the chamber 33 and adapted to engage the stem 38 of a valve 37 contained within the chamber 33. The lower end of the stem 38 extends into a bore in the plug 31. A spring 39 is provided within the chamber 33, the lower end of which engages the plug 31 and the upper end of which engages a collar 41 carried by the stem 38 for urging the valve 37 upwardly to its seat and the valve 36 upwardly from its seat. A magnet 42 is provided in the upper end of the casing which, when energized, forces the valve 36 downwardly to its seat and the valve 37 downwardly from its seat.

The pressure operated switch device 22 comprises a casing providing a piston chamber 44 that is in constant open communication with the control pipe 16 and which contains a piston 45 that is connected by a stem to a movable switch contact member 46 that is adapted to engage fixed switch contact members 47 and 48 to connect one terminal of a battery 49 to a conductor 52. A spring 51 within the casing of the switch device 22 biases the piston 45 and the contact member 46 to their lower or illustrated position. A circuit is completed from the conductor 52 through the primary winding 54 of a transformer 53, conductor 55 and brush 56 of a circuit interrupting device having conducting segments 57 and 58 separated by insulating segments 59 and 62 that are adapted to engage the brush 56 to intermittently interrupt the circuit through the transformer primary winding at a rate depending upon the vehicle speed.

The tuned relay 19 comprises a winding 63 and an armature 64 that is normally held in its upper or illustrated position by a spring 65 and is adapted when the winding 63 is energized to complete a circuit from the conductor 52 through a conductor 66, the winding of the magnet 42 to ground at 67 and to the grounded terminal 68 of the battery 49. The winding 63 of the tuned relay 19 is energized from the secondary winding 72 of the transformer 53. The inductance of the winding 72, the resistance of the winding 63, and the capacitance of the condenser 73 are so adjusted as to provide a tuned circuit such that the relay 19 will remain energized so long as the frequency in the secondary winding of the transformer 53 is above a predetermined value, and will become deenergized when the frequency in the transformer secondary winding falls below that predetermined value.

The operation of the equipment described is as follows.

Upon the supply of fluid under pressure to the control pipe 16 to effect an application of the brakes the piston 45 in the pressure operated switch device 22 moves upwardly against the bias of the spring 51 to close the circuit through the primary winding 54 of the transformer 53, which circuit is intermittently interrupted at the brush 56 by the insulating portions 59 and 62 on the collector ring, thus developing a frequency in the secondary winding 72 of the transformer 53 corresponding to the speed of the wheel 1. If, upon the application of the brakes, the vehicle is traveling at a sufficiently high speed to cause the tuned circuit including the secondary transformer winding 72 to energize the winding 63 of the tuned relay 19, the armature 64 will be attracted into circuit-closing position to complete a circuit through the winding of the magnet 42 of the brake control valve device 17, thus forcing the valve 36 downwardly to its seat to close communication from the piston chamber 23 to the atmosphere through the exhaust port 35 and effecting communication from the chamber 33 to the piston chamber 23.

As the pressure in the control pipe 16 builds up, fluid under pressure will flow through the passage 16 in the brake control valve device 17 to the slide valve chamber 27 and through passage and pipe 18 to the brake cylinder 7 to force the upper ends of the cylinder levers 14 and 12 apart and force the brake shoes 5 and 6 against the wheel 1. Fluid under pressure will also flow from the slide valve chamber 27 through port 32 in the plug 31 to the chamber 33, past the valve 37 that is unseated upon the energization of the winding of the magnet 42 in a manner to be presently described, through a passage 70 to the piston chamber 23 so that the pressure within the piston chamber 23 is maintained at a value sufficient to hold the piston 24 against the shoulder 29 so long as the magnet 42 is energized.

If the degree of application of the brakes becomes sufficient to cause the wheel 1 to slow down below a speed such that the frequency of interruptions in the circuit of the primary winding 54 results in a frequency of alternating current in the secondary winding 72 of the transformer below the value necessary to maintain the relay 19 energized, the relay armature 64 will be urged upwardly by the spring 65, thus interrupting the above traced circuit through the windings of the magnet 42.

Upon interruption of this circuit the spring 39 forces the valve 37 upwardly to its seat, closing communication between the chamber 33 and the piston chamber 23, and forcing the valve 36 upwardly from its seat to effect communication from the piston chamber 23 to the atmosphere through the exhaust port 35. Upon the venting of fluid under pressure from the piston chamber 23 the force of the spring 34 is insufficient to overcome the pressure in the slide valve chamber 27 on the upper side of the piston 24 and the piston is forced downwardly thus moving the slide valve 26 to a position such that a cavity 73 therein effects communication between the brake cylinder passage 18 and a passage 74 leading to the atmosphere through a safety valve 75 that is adjusted to permit the release of fluid under pressure when above some predetermined pressure. The pressure in the brake cylinder 7 is thus automatically reduced to the value determined by the setting of the safety valve device 75.

If, upon the reduction in brake cylinder pressure thus effected, the speed of the vehicle is such that the wheel 1 will again rotate above the predetermined speed necessary to energize the tuned relay 19, this relay will again operate to complete the circuit through the winding of the magnet 42 and force the valves 36 and 37 downwardly to cause the pressure in the piston chamber 23 to equalize with the pressure in the slide valve chamber 27 at a value corresponding to the pressure in the control pipe 16. Upon the equalization of these pressures the spring 34 forces the piston 24 together with its stem 25 and slide valve 26 upwardly to their illustrated positions, and again permit the flow of fluid under pressure from the pipe 16 to the brake cylinder 7 to increase the braking force.

It will be noted that, upon the slowing down of the wheel 1 resulting from the decrease in speed of the vehicle the brake cylinder pressure is automatically decreased through the safety valve 75 in the same manner as when the wheel slips on the rails at a high vehicle speed. In this case, however, the magnet 42 will not be reenergized upon the decrease in brake cylinder pressure so that the brake cylinder pressure is not again built up but remains at its low value, which is desirable when the vehicle speed becomes reduced to a low value.

It will be apparent to those skilled in the art that many modifications in the apparatus and circuits illustrated and described may be made without departing from the spirit of my invention and I do not wish to be limited otherwise than by the scope of the appended claims.

Having now described my invention, what I claim as new and desire to secure by Letters Patent, is:

1. In a brake equipment for vehicles, in combination, a brake cylinder, a control pipe, means for supplying fluid under pressure to said brake cylinder at control pipe pressure, a valve device for interrupting communication between said control pipe and said brake cylinder and for venting fluid under pressure from said brake cylinder to a predetermined low value, said valve device comprising a valve and a piston for moving the valve, said piston being constantly subject on one side to the pressure in the control pipe and normally subject on the other side to the pressure in the control pipe and also to an additional biasing force, electrical means responsive to the speed of rotation of a vehicle wheel for releasing fluid under pressure from the second named side of said piston for effecting movement of said valve to effect a reduction in brake cylinder pressure.

2. In a brake equipment for vehicles, in combination, a brake cylinder, means including a control pipe for supplying fluid under pressure to said brake cylinder at control pipe pressure, valve means between said control pipe and said brake cylinder for effecting a reduction in brake cylinder pressure to a predetermined value, electrical means for controlling said valve means to reduce the brake cylinder pressure, means for controlling the energization of said electrical means comprising a relay, a transformer for energizing said relay and comprising a secondary winding connected thereto and a primary winding, a source of direct current electrical energy for the primary winding of said transformer and means responsive to the speed of revolution of a vehicle wheel for intermittently interrupting said primary winding circuit, said relay circuit being tuned to effect a substantial energization of the relay when the frequency of interruptions are above a predetermined value and to remain deenergized when the frequency of interruption of said circuit is below said predetermined value.

3. In a brake equipment for vehicles, in combination, a brake cylinder, a control pipe, means for supplying fluid under pressure to said brake cylinder at control pipe pressure, valve means between said control pipe and said brake cylinder, electrical means for controlling said valve means to reduce the brake cylinder pressure to a predetermined value and including an electrical relay, means for supplying alternating current to said relay at a frequency corresponding to the speed of the car wheel, said relay being so tuned as to become energized when supplied with alternating current above a predetermined frequency and unenergized when supplied with alternating current below said predetermined frequency.

4. In a brake equipment for vehicles, in combination, a cylinder, a control pipe, means for supplying fluid under pressure to said brake cylinder at control pipe pressure, valve means between said control pipe and said brake cylinder, electrical means for controlling said valve means to reduce brake cylinder pressure to a predetermined value and including an alternating current relay responsive to alternating current above a predetermined frequency, means for controlling the energization of said relay including a transformer the secondary winding of which is connected to said relay, and the primary winding of which is supplied with direct current, and means for interrupting the primary winding circuit intermittently at a rate corresponding to the speed of the car wheel.

5. In a brake equipment for vehicles, in combination, a brake cylinder, a control pipe, means for supplying fluid under pressure to said brake cylinder at control pipe pressure, a valve device for interrupting communication between said control pipe and said brake cylinder and for venting fluid under pressure from said brake cylinder to a predetermined low value, said valve device comprising a valve and a piston for moving the valve, said piston being constantly subject on one side to the pressure in the control pipe and normally subject on the other side to the pressure in the control pipe and also to an additional biasing force, electrical means responsive to the speed of rotation of a car wheel for releasing fluid under pressure from the second named side of said piston for effecting movement of said valve to a brake releasing position, means for controlling the energization of said electrical means comprising a relay, a transformer for energizing said relay and comprising a secondary winding connected thereto and a primary winding, a source of direct current electrical energy for the primary winding of said transformer and means responsive to the speed of revolution of a vehicle wheel for intermittently interrupting said primary winding circuit, said relay circuit being tuned to effect a substantial energization of the relay when the energizing circuit is above a predetermined frequency and to effect the deenergization of said relay when the frequency of said circuit is below said predetermined frequency.

6. In a brake equipment for vehicles, in combination, a brake cylinder, a control pipe, means for supplying fluid under pressure to said brake cylinder at control pressure, a valve device for interrupting communication between said control pipe and said brake cylinder and for venting fluid under pressure from said brake cylinder to a predetermined low value, said valve device comprising a valve and a piston for moving the valve, said piston being constantly subject on one side to the pressure in the control pipe and normally subject on the other side to the pressure in the control pipe and also to an additional biasing force, electrical means for releasing fluid under pressure from the second named side of said piston for causing movement of said valve to effect a reduction in brake cylinder pressure and including an electrical relay, means for supplying alternating current to said relay at a frequency corresponding to the speed of a car wheel, said relay being so tuned as to become energized when supplied with alternating current above a predetermined frequency and unenergized when supplied with alternating current below said predetermined frequency.

7. In a brake equipment for vehicles, in combination, a brake cylinder, a control pipe, means for supplying fluid under pressure to said brake cylinder at control pipe pressure, a valve device for interrupting communication between said control pipe and said brake cylinder and for venting fluid under pressure from said brake cylinder to a predetermined low value, said valve device comprising a valve and a piston for moving the valve, said piston being constantly subject on one side to the pressure in the control pipe and normally subject on the other side to the pressure in the control pipe and also to an additional biasing force, electroresponsive means for releasing fluid under pressure from the second named side of said piston for causing movement of said valve to effect a reduction in brake cylinder pressure, an alternating current tuned relay responsive to alternating current above a predetermined frequency for effecting the energization of said electroresponsive means, means for controlling said relay including a transformer a secondary winding of which is connected to said relay and a primary winding of which is supplied with direct current, and means for interrupting the primary winding circuit intermittently at a rate corresponding to the speed of a vehicle wheel.

8. In a brake equipment for vehicles, in combination, a brake cylinder, means for supplying fluid under pressure to said brake cylinder, valve means for effecting a reduction in brake cylinder pressure to a predetermined value, electrical means for controlling said valve means, an alternating current tuned relay operatively responsive only to alternating current above a predetermined frequency for effecting energization of said electrical means, means for controlling said relay including a transformer a secondary winding of which is connected to said relay and a primary winding of which is supplied with direct current, and means for intermittently interrupting the primary winding circuit at a rate corresponding to the speed of the vehicle.

9. In a brake equipment for vehicles, in combination, a brake cylinder, means for supplying fluid under pressure to said brake cylinder, valve means for effecting a reduction in brake cylinder pressure to a predetermined value, electrical means for controlling said valve means and including an electrical relay, means for supplying alternating current to said relay having a frequency corresponding to the speed of a car wheel, said relay being so tuned as to become energized when supplied with alternating current above a predetermined frequency and unenergized when supplied with alternating current below said predetermined frequency.

10. In a vehicle brake equipment, in combination, a brake cylinder, a pipe through which fluid under pressure may be supplied to effect an application of the brakes, electroresponsive means effective when energized to cause communication to be opened through the said pipe to the brake cylinder and when deenergized to cause communication through the pipe to the brake cylinder to be closed and a communication from the brake cylinder to atmosphere to be opened, and electrical means operative to complete the circuit of the electroresponsive means and cause energization thereof only so long as the frequency of the alternating current supplied to the electrical means exceeds a certain uniform frequency.

11. In a vehicle brake equipment, in combination, a brake cylinder, a pipe through which fluid under pressure may be supplied to effect an application of the brakes, electroresponsive means effective when energized to cause communication to be opened through the said pipe to the brake cylinder and when deenergized to cause communication through the pipe to the brake cylinder to be closed and a communication from the brake cylinder to atmosphere to be opened, electrical means operative to complete the circuit of the electroresponsive means and cause energization thereof only so long as the alternating current supplied to the electrical means exceeds a certain uniform frequency, and means for supplying alternating current to said electrical means at a frequency corresponding to the speed of rotation of a vehicle wheel.

12. In a vehicle brake equipment in combination, a brake cylinder, a pipe through which fluid under pressure may be supplied to the brake cylinder to effect an application of the brakes, valve means effective in one position to open communication through said pipe to permit the flow of fluid under pressure to the brake cylinder and operative to a second position to cut off communication through said pipe to the brake cylinder and to establish a communication through which fluid under pressure is released from the brake cylinder, electrical means effective as long as alternating current of a frequency above a certain uniform frequency is supplied thereto for causing the valve means to be maintained in the said one position thereof, and means subject to the pressure in said pipe for shifting the valve means to the said second position thereof when the frequency of the alternating current supplied to the said electrical means is less than said certain frequency.

13. In a vehicle brake equipment, in combination, a brake cylinder, a pipe through which fluid under pressure may be supplied to the brake cylinder to effect an application of the brakes, valve means effective in one position to open communication through said pipe to permit the flow of fluid under pressure to the brake cylinder and operative to a second position to cut off communication through said pipe to the brake cylinder and to establish a communication through which fluid under pressure is released from the brake cylinder, and electrical means effective as long as alternating current of a frequency above a certain uniform frequency is supplied thereto for causing the valve means to be maintained in the said one position thereof, means subject to the pressure in said pipe for shifting the valve means to the said second position thereof when the frequency of the alternating current supplied to the said electrical means is less than said certain frequency, and means for supplying alternating current to said electrical means at a frequency corresponding to the rotative speed of a vehicle wheel.

14. In a vehicle brake equipment, in combination, a brake cylinder, a pipe through which fluid under pressure may be supplied to the brake cylinder to effect an application of the brakes, a valve having one position for opening communication through the pipe to the brake cylinder and a second position in which the communication through the said pipe is closed and a communication established through which fluid under pressure is released from the brake cylinder, fluid pressure responsive means for operating said valve and subject in opposing relation to the pressure in the said pipe and the pressure in a chamber, means for biasing the valve to the said one position thereof when the pressure in the pipe and the pressure in the chamber are substantially equalized, electrosponsive means effective when energized to cause the pressure in the said pipe and in said chamber to be substantially equalized and effective when deenergized to reduce the pressure in the said chamber and cause the higher pressure in said pipe acting on the fluid pressure responsive means to shift the said valve from the said one to the said second position thereof, and electrical means controlling the circuit of the electroresponsive means and effective to cause energization of the electrosponsive means only so long as the frequency of the alternating current supplied thereto exceeds a certain uniform frequency.

15. In a vehicle brake equipment, in combination, a brake cylinder, a pipe through which fluid under pressure may be supplied to the brake cylinder to effect an application of the brakes, a valve having one position for opening communication through the pipe to the brake cylinder and a second position in which the communication through the said pipe is closed and a communication established through which fluid under pressure is released from the brake cylinder, fluid pressure responsive means for operating said valve and subject in opposing relation to the pressure in the pipe and the pressure in a chamber, means for biasing the valve to the said one position thereof when the pressure in the pipe and the pressure in the chamber are substantially equalized, electroresponsive means effective when energized to cause the pressure in the pipe and in the said chamber to be substantially equalized and effective when deenergized to reduce the pressure in the said chamber and cause the higher pipe pressure acting on the fluid pressure responsive means to shift the said valve from the said one to the said second position thereof, electrical means controlling the circuit of the electroresponsive means and effective to cause energization of the electroresponsive means only so long as the frequency of the alternating current supplied thereto exceeds a certain frequency, and means for supplying alternating current to said electrical means at a frequency corresponding to the speed of rotation of a vehicle wheel.

16. In a vehicle brake equipment, in combination, a brake cylinder, a pipe through which fluid under pressure may be supplied to the brake cylinder to effect an application of the brakes, valve means effective in one position to open communication through said pipe to permit the flow of fluid under pressure to the brake cylinder and operative to a second position to cut off communication through said pipe to the brake cylinder and to establish a communication through which fluid under pressure is released from the brake cylinder, and electrical means effective as long as alternating current of a frequency above a certain uniform frequency is supplied thereto for causing the valve means to be maintained in the said one position thereof, means subject to the pressure in said pipe for shifting the valve means to the said second position thereof when the frequency of the alternating current supplied to the said electrical means is less than said certain frequency, and means for rendering the electrical means ineffective to control the valve means regardless of the frequency of the alternating current supplied thereto unless the pressure in the said pipe exceeds a certain uniform pressure.

17. In a vehicle brake equipment, in combination, a brake cylinder, a pipe through which fluid under pressure may be supplied to the brake cylinder to effect an application of the brakes, valve means effective in one position to open communication through said pipe to permit the flow of fluid under pressure to the brake cylinder and operative to a second position to cut off communication through said pipe to the brake cylinder and to establish a communication through which fluid under pressure is released from the brake cylinder, and electrical means effective as long as alternating current of a frequency above a certain uniform frequency is supplied thereto for causing the valve means to be maintained in the said one position thereof, means subject to the pressure in said pipe for shifting the valve means to the said second position thereof when the frequency of the alternating current supplied to the said electrical means is less than said frequency, and means effective when the said valve means is in its second position for preventing further release of fluid under pressure from the brake cylinder through the said release communication when the pressure in the brake cylinder reduces to a certain uniform pressure.

RAYMOND E. MILLER.